United States Patent
Berjot et al.

(10) Patent No.: US 11,434,016 B2
(45) Date of Patent: Sep. 6, 2022

(54) ENGINE ATTACHMENT SYSTEM FOR AN AIRCRAFT ENGINE

(71) Applicant: Airbus Operations SAS, Toulouse (FR)

(72) Inventors: Michael Berjot, Colomiers (FR); Olivier Dubois, Castelginest (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 224 days.

(21) Appl. No.: 16/849,293

(22) Filed: Apr. 15, 2020

(65) Prior Publication Data

US 2020/0331619 A1 Oct. 22, 2020

(30) Foreign Application Priority Data

Apr. 18, 2019 (FR) ..................................... 1904147

(51) Int. Cl.
 *B64D 27/26* (2006.01)

(52) U.S. Cl.
 CPC ........ *B64D 27/26* (2013.01); *B64D 2027/268* (2013.01)

(58) Field of Classification Search
 CPC ........................... B64D 27/26; B64D 2027/268
 See application file for complete search history.

(56) References Cited

U.S. PATENT DOCUMENTS

| 2010/0147996 | A1 | 6/2010 | Hartshorn et al. |
| 2017/0057652 | A1* | 3/2017 | Journade ................. B64D 27/18 |
| 2018/0186462 | A1 | 7/2018 | Brochard |

FOREIGN PATENT DOCUMENTS

| FR | 3040369 A1 | 3/2017 | |
| FR | 3059982 A1 * | 6/2018 | ............ B64D 27/26 |
| FR | 3059982 A1 | 6/2018 | |
| FR | 3061480 A1 | 7/2018 | |

OTHER PUBLICATIONS

FR3059982A1 Translation (Year: 2018).*
French Search Report; priority document.

* cited by examiner

*Primary Examiner* — Richard R. Green
*Assistant Examiner* — Steven J Shur
(74) *Attorney, Agent, or Firm* — Greer, Burns & Crain, Ltd.

(57) ABSTRACT

An engine attachment system for an engine including an engine nacelle. The engine attachment system includes an engine pylon with a starboard face and a port face, a starboard shoe having a starboard sole fixed to the starboard face and a starboard wall secured to the starboard sole, a port shoe having a port sole fixed to the port face and a port wall secured to the port sole, a starboard link fixed in an articulated manner by one of its ends to the starboard wall and configured to be articulatedly fixed by the other of its ends to the engine nacelle, a port link articulatedly fixed by one of its ends to the port wall and configured to be atriculatedly fixed by the other of its ends to the engine nacelle, and a fixing arrangement that fixes each sole to the corresponding face of the engine pylon.

3 Claims, 2 Drawing Sheets

US 11,434,016 B2

ENGINE ATTACHMENT SYSTEM FOR AN AIRCRAFT ENGINE

CROSS-REFERENCES TO RELATED APPLICATIONS

This application claims the benefit of the French patent application No. 1904147 filed on Apr. 18, 2019, the entire disclosures of which are incorporated herein by way of reference.

FIELD OF THE INVENTION

The present invention concerns an engine attachment system for an aircraft engine and an aircraft including at least one such engine attachment system.

BACKGROUND OF THE INVENTION

An aircraft conventionally includes at least one engine, in particular, a jet engine. Under each wing, and for each engine, the aircraft includes an engine pylon that is fixed to the structure of the wing and which lies under the wing, and the engine is suspended under the engine pylon.

The engine is fixed to the engine pylon by means of an engine attachment system comprising a front engine attachment and a rear engine attachment.

The front engine attachment conventionally includes a beam fixed under the engine pylon and two links fixed between the beam and a front part of the engine.

In the case of a high dilution jet engine, the diameter of the engine is increased and it is then necessary for the engine to be closer to the pylon. Because of the presence of the beam between a lower face of the pylon and the engine, moving the engine closer is limited and it is therefore necessary to find a new arrangement that enables the engine to be moved as close as possible to the pylon.

SUMMARY OF THE INVENTION

An object of the present invention is to propose an engine attachment system that comprises an engine pylon and an engine attachment that enables the engine to be moved closer to the engine pylon.

To this end there is proposed an engine attachment system for an engine of an aircraft which includes an engine nacelle, and in which the engine attachment system includes:

an engine pylon with a starboard face and a port face,
a starboard shoe having a starboard sole fixed to the starboard face and a starboard wall secured to the starboard sole,
a port shoe having a port sole fixed to the port face and a port wall secured to the port sole,
a starboard link fixed in an articulated manner by one of its ends to the starboard wall and intended to be fixed in an articulated manner by the other of its ends to the engine nacelle,
a port link fixed in an articulated manner by one of its ends to the port wall and intended to be fixed in an articulated manner by the other of its ends to the engine nacelle, and
fixing means that fix each sole to the corresponding face of the engine pylon.

An engine attachment system of this kind enables the engine to be moved closer to the engine pylon to save space vertically.

Advantageously, the fixing means include for each sole two shear pins having a central bore and four traction screws, for each shear pin the engine pylon has a blind bore and the sole has a through-bore, in which the shear pin is fixed, each shear pin has a rim bearing against an exterior face of the associated sole, for each shear pin a traction screw has a head bearing against the rim and is screwed into the bottom of the blind bore, and two other traction screws are screwed into the engine pylon sandwiching the sole.

Advantageously, a ring is disposed in the blind bore around each shear pin.

The invention also proposes an aircraft including a structure, an engine with an engine nacelle and an engine attachment system according to any one of the preceding variants, in which the engine pylon is fixed to the structure, and in which each of the other ends of the links is fixed to the nacelle.

BRIEF DESCRIPTION OF THE DRAWINGS

The features of the invention mentioned hereinabove and others will become more clearly apparent on reading the following description of at least one embodiment, the description being given with reference to the appended drawings, in which.

DETAILED DESCRIPTION OF THE PREFERRED EMBODIMENTS

Figure 1:
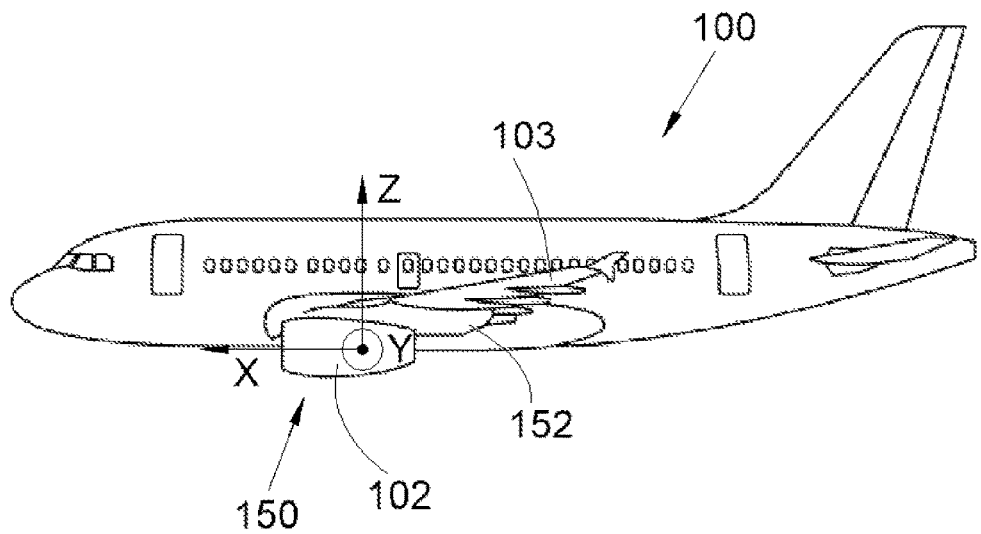
FIG. 1 is a side view of an aircraft according to the invention.

In the following, description terms relating to a position are referred to an aircraft in a forward movement position, that is to say, as represented in FIG. 1. In particular, the "starboard" and "port" positions are defined relative to the normal direction of flight of the aircraft.

FIG. 1 shows an aircraft 100 that has an engine 102, in particular, a ducted fan jet engine.

In the following description, and by convention, X denotes the longitudinal axis of the engine 102 oriented positively in the direction of forward movement of the aircraft 100, Y designates the transverse direction of the engine 102 that is horizontal when the aircraft is on the ground, and Z designates the vertical direction or vertical height when the aircraft is on the ground, these three directions X, Y and Z being mutually orthogonal.

In the embodiment of the invention shown in FIG. 1, the aircraft 100 includes an engine 102 under each wing 103, but it is possible to provide a plurality of engines under each wing 103.

Under each wing 103, and for each engine 102, the aircraft 100 has an engine attachment system 150 that is fixed to the structure of the wing 103 and extends under the wing 103 and supports the engine 102.

The engine attachment system 150 comprises an engine pylon 152 fixed to the structure of the wing 103.

Figure 2:
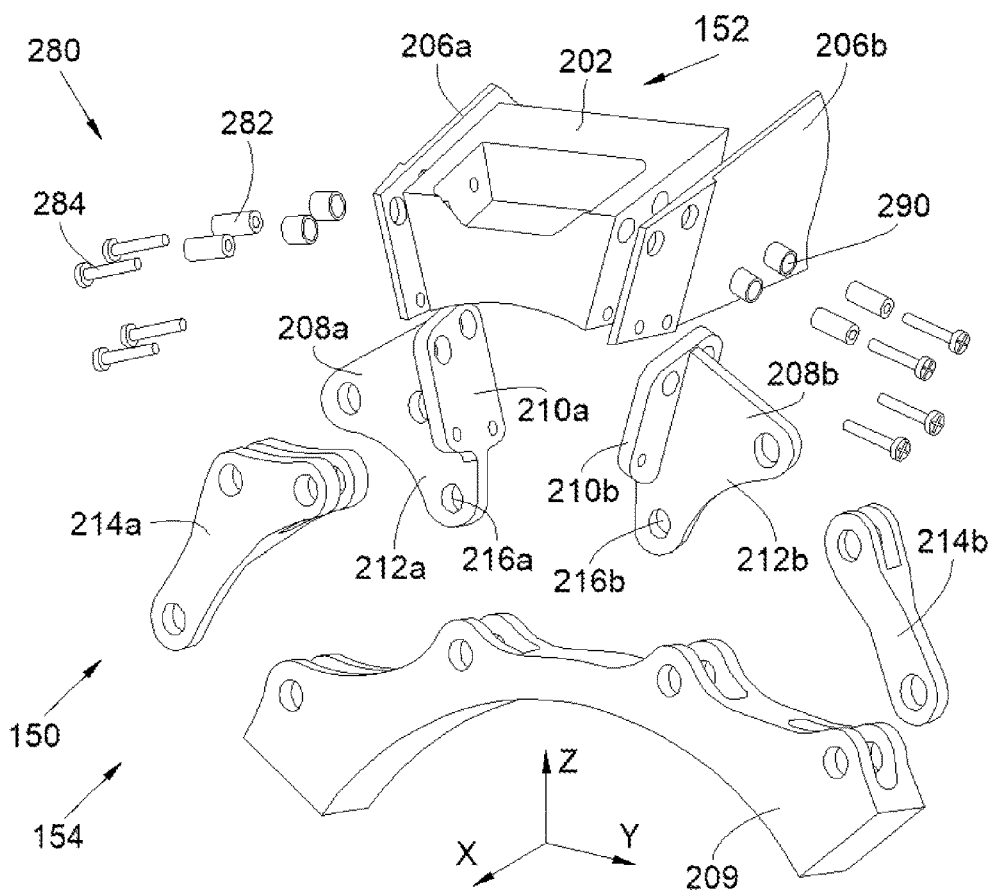
FIG. 2 is an exploded perspective view of an engine attachment system according to the invention.

FIG. 2 shows an exploded view of the engine attachment system 150 which also includes an engine attachment 154 fixed to the engine pylon 152 and to which the engine 102 is fixed, here by means of its arcuate shape engine nacelle 209. The engine attachment system 150 may be used at the level of the front engine attachment or the rear engine attachment to absorb the engine torque.

In the embodiment of the invention shown here, and in known manner, the engine pylon 152 takes the form of a box section that includes, inter alia, a front structural part 202 and, on each side, a lateral wall 206a-b. As described hereinafter, each lateral wall 206a-b is fixed to the front structural part 202 by means of fixing means also fixing the engine attachment 154, but it is possible to provide a different engine pylon 152 structure.

The front face of the engine pylon 152 extends in a front plane that is globally perpendicular to the longitudinal axis X, that is to say, globally parallel to the plane YZ.

In the context of the invention, the engine pylon 152 includes a starboard face that here is materialized by the starboard lateral wall 206a and a port face materialized by the port lateral wall 206b.

Figures 3, 4:
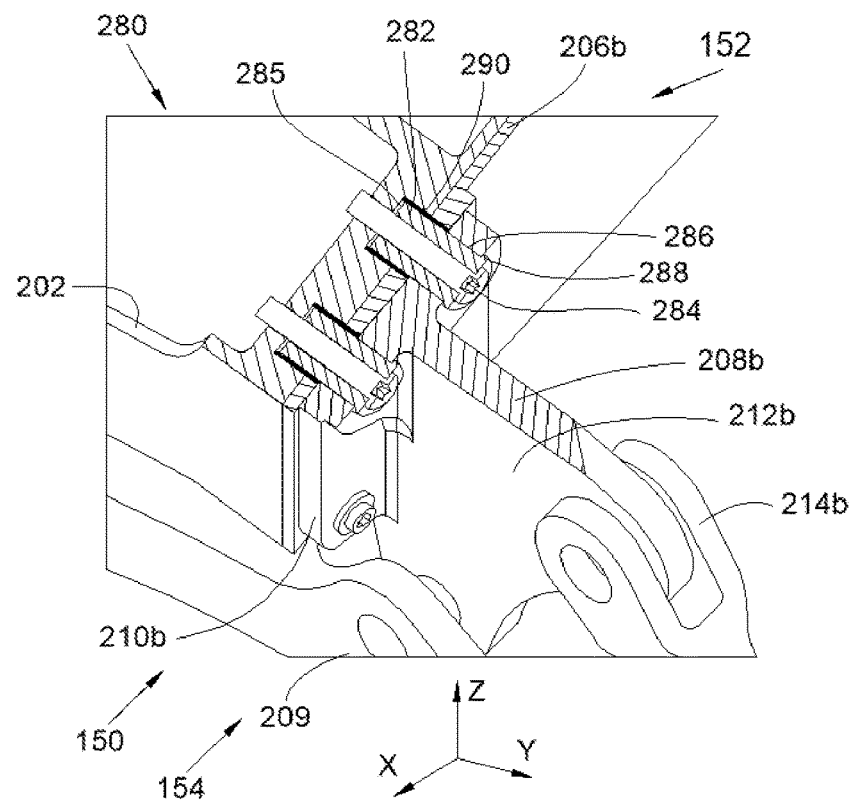
FIG. 3 is a perspective and sectional view of the engine attachment system from FIG. 2.
FIG. 4 is a front view of the engine attachment system from FIG. 2.

Referring to FIGS. 2 and 3, the engine attachment 154 includes a starboard shoe 208a and a port shoe 208b.

The starboard shoe 208a is fixed to the starboard face and the port shoe 208b is fixed to the port face.

The starboard shoe 208a includes a starboard sole 210a that extends in a plane parallel to the starboard face and has bores for placing therein fixing means described hereinafter that take the form of screwing elements. The starboard shoe 208a also includes a starboard wall 212a secured to the starboard sole 210a that extends in a plane parallel to the front plane.

The port shoe 208b includes a port sole 210b that extends in a plane parallel to the port face and that has bores for placing therein fixing means described hereinafter that take the form of screwing elements. The port shoe 208b also includes a port wall 212b secured to the port sole 210b that extends in a plane parallel to the front plane.

The engine attachment 154 also includes a starboard link 214a and a port link 214b. The starboard link 214a is fixed in an articulated manner by one of its ends to the starboard wall 212a and in an articulated manner by the other of its ends to the engine nacelle 209. The port link 214b is fixed in an articulated manner by one of its ends to the port wall 212b and in an articulated manner by the other of its ends to the engine nacelle 209.

The connections between the links 214a-b and the walls 212a-b, on the one hand, and the engine nacelle 209, on the other hand, are produced here by clevis type connections with clevis pins not represented in FIGS. 2 and 3.

Each link 214a-b and the shoes 208a-b define in combination a primary path of forces between the engine 102 and the engine pylon 152 to withstand the loads of the engine 102 under normal conditions of operation of the engine 102.

The engine attachment system 250 also includes fixing means 280 that fix each sole 210a-b to the corresponding face of the engine pylon 152.

Because of the fixing of the shoes 208a-b at the level of the lateral faces of the engine pylon 152, the space under the engine pylon 152 is free and the engine 102 can be raised closer to the engine pylon 152.

In the embodiment of the invention shown here, the starboard link 214a is a three-point link, that is to say, has two points of connection with the starboard wall 212a and one point of connection with the engine nacelle 209.

In the embodiment of the invention shown here, the port link 214b is a two-point link, that is to say, has one point of connection with the port wall 212b and one point of connection with the engine nacelle 209.

The embodiment of the invention shown in FIG. 2 enables the engine torque to be absorbed, but it is also possible to absorb vertical and lateral forces with a two-point link on each side.

The engine attachment system 150 includes a supplementary starboard connection point 216a and a supplementary port connection point 216b. Here the supplementary connection points 216a-b are disposed on respective opposite sides of the median plane XZ and each provides a supplementary connection between the wall 212a-b and the engine nacelle 209. Each supplementary connection point 216a-b takes the form of a waiting fail-safe fixing point to compensate failure of the primary force path, that is to say, at least one of the links 214a-b. That is to say, if a component of the primary force path is damaged, activation of a waiting fail-safe fixing point creates an auxiliary force path between the engine 102 and the engine pylon 152.

Each waiting fail-safe fixing point 216-b is constituted, for example, of a clevis produced in the engine nacelle 209 and a clevis pin inserted in the clevis that passes through a bore in the wall 212a-b, the diameter of which is greater than the diameter of the clevis pin. Thus, in normal operation there is no contact between the clevis pin and the wall 212a-b, and should one of the links 214a-b break, the engine 102 will move and the clevis pin come into contact with the wall 212a-b.

The fixing means 280 include, for each sole 210a-b, two shear pins 282 and four traction screws 284. FIG. 3 shows a section at the level of a plane passing through the axes of the shear pins 282 on the port side.

For each shear pin 282, the engine pylon 152 has a blind bore 285 which, in the embodiment of the invention described here, passes through the lateral wall, here the port lateral wall 206b, and partly through the front structural part 202.

For each shear pin 282 the sole, here the port sole 210b, is pierced by a through-bore 286.

The shear pin 282 is inserted in the blind bore 285 and in the through-bore 286.

Each shear pin 282 has a rim 288 that bears against the exterior face of the sole 210b.

Each shear pin 282 has a central bore that passes through it and enables the passage of a traction screw 284 that screws into the engine pylon 152 at the level of the bottom of the blind bore 285.

On screwing in the traction screw 284, the head of the traction screw 284 comes to bear against the rim 288 and therefore to retain in position the shear pin 282 and the sole 210b by sandwiching them.

In the embodiment of the invention shown here, the two shear pins 282 on the same side are globally aligned along the longitudinal axis X.

The other two traction screws 284 also screw into the engine pylon 152 and also sandwich the sole 210b.

Fitting and tightening each of the other traction screws 284 enables clamping of the lateral wall 206a-b against the front structural part 202.

The two shear pins 282 absorb the vertical forces of the engine 102 in shear. The shear pins 282 are fitted into the engine pylon 152, and here more particularly, into the lateral walls 206a-b and the shear forces then pass directly through them.

The four traction screws 284 absorb lateral forces coming from the engine 102. The traction screws 284 that pass through the shear pins 282 make it possible to optimize the overall size.

In the embodiment of the invention shown here, a ring 290 is disposed around each shear pin 282 and in the blind bore 285 to ensure a good fit and to enable repair in the event of damage.

FIG. 4 shows the direction of the forces at each fixing point, that is to say:

between the engine nacelle 209 and each link 214a-b, between each link 214a-b and the associated wall 212a-b, and between the engine pylon 152 and each starboard sole 210a-b.

FIG. 4 also shows the direction of the forces absorbed by each supplementary connection point 216a-b, if required.

Fixing the engine attachment 154 to the engine pylon 152 comprises fixing each shoe 208a-b and each link 214a-b to the engine nacelle 209 and then moving the resulting assembly closer to the engine pylon 152 by raising the assembly.

Each sole 210a-b then comes up against the corresponding lateral wall 206a-b and the fixing means 280 are fitted to fix the assembly.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine attachment system for an engine of an aircraft which includes an engine nacelle, and in which the engine attachment system includes:

an engine pylon with a starboard face and a port face, a starboard shoe having a starboard sole fixed to the starboard face and a starboard wall secured to the starboard sole, a port shoe having a port sole fixed to the port face and a port wall secured to the port sole, a starboard link fixed in an articulated manner by a first end thereof to the starboard wall and configured to be fixed in an articulated manner by a second end thereof to the engine nacelle, a port link fixed in an articulated manner by a first end thereof to the port wall and configured to be fixed in an articulated manner by a second end thereof to the engine nacelle, and fixing means configured to fix each sole to the corresponding face of the engine pylon, wherein the fixing means include for each sole, two shear pins having a central bore and four traction screws, wherein for each shear pin the engine pylon has a blind bore and the sole has a through-bore, in which said shear pin is fixed, wherein each shear pin has a rim bearing against an exterior face of the associated sole, wherein for each shear pin a traction screw has a head bearing against the rim and is screwed into the bottom of the blind bore, and wherein two other traction screws are screwed into the engine pylon sandwiching the sole.

2. The engine attachment system according to claim 1, wherein a ring is disposed in the blind bore around each shear pin.

3. An aircraft including a structure, an engine with an engine nacelle and an engine attachment system according to claim 1, wherein the engine pylon is fixed to the structure, and wherein each of said second ends of the links is fixed to the nacelle.

* * * * *